United States Patent
Seymour

(10) Patent No.: US 6,199,895 B1
(45) Date of Patent: Mar. 13, 2001

(54) INFLATABLE RESTRAINT SYSTEM WITH SELECTABLE VENTILATION

(76) Inventor: Brian T. Seymour, 3255 Berkshire Dr., Bloomfield Hills, MI (US) 48301

( * ) Notice: Subject to any disclaimer, the term of this patent is extended or adjusted under 35 U.S.C. 154(b) by 0 days.

(21) Appl. No.: 09/276,612

(22) Filed: Mar. 25, 1999

(51) Int. Cl.[7] .................................................. B60R 21/28
(52) U.S. Cl. ....................... 280/728.2; 280/739
(58) Field of Search .................... 280/739, 736, 280/735, 742, 728.2

(56) References Cited

U.S. PATENT DOCUMENTS

| | | | |
|---|---|---|---|
| 3,861,712 | * | 1/1975 | Matsui et al. .......................... 280/739 |
| 3,884,499 | * | 5/1975 | Oka et al. ............................. 280/739 |
| 4,183,550 | * | 1/1980 | Sudou ................................ 280/728.2 |
| 4,989,895 | * | 2/1991 | Pearson et al. ........................ 280/739 |
| 5,074,583 | | 12/1991 | Fujita et al. . |
| 5,184,845 | | 2/1993 | Omura . |
| 5,232,243 | | 8/1993 | Blackburn et al. . |
| 5,330,226 | | 7/1994 | Gentry et al. . |
| 5,413,378 | | 5/1995 | Steffens, Jr. et al. . |
| 5,439,249 | | 8/1995 | Steffens, Jr. et al. . |
| 5,494,311 | | 2/1996 | Blackburn et al. . |
| 5,531,472 | | 7/1996 | Semchena et al. . |
| 5,573,269 | | 11/1996 | Gentry et al. . |
| 5,624,132 | | 4/1997 | Blackburn et al. . |
| 5,664,802 | * | 9/1997 | Harris et al. .......................... 280/736 |
| 5,871,236 | * | 2/1999 | Bauer et al. .......................... 280/739 |

FOREIGN PATENT DOCUMENTS

| | | |
|---|---|---|
| 0 790 157 A2 | 8/1997 | (EP) . |
| 1 338 814 | 11/1973 | (GB) . |
| 1 405 210 | 9/1975 | (GB) . |
| 2 329 364 | 3/1999 | (GB) . |

* cited by examiner

Primary Examiner—Peter C. English
(74) Attorney, Agent, or Firm—Lyon P.C.

(57) ABSTRACT

An inflatable restraint system with selectable ventilation, including a base plate defining a vent aperture, an inflatable cushion secured to the base plate, and a single conventional inflator for inflating the inflatable cushion with inflation gas. In some vehicle impacts, the vent aperture remains sealed with a vent plug, which inhibits ventilation of the inflation gas from the inflatable cushion through the vent aperture. In other vehicle impacts, depending on the placement and force of the impact, the speed and direction of the vehicle, and the size and placement of the passengers, the energy absorption characteristics of the inflatable cushion may be controlled. This is accomplished by an initiator, which may be selectively activated to rupture the vent plug and thereby allow selective ventilation of the inflation gas through the vent aperture.

14 Claims, 2 Drawing Sheets

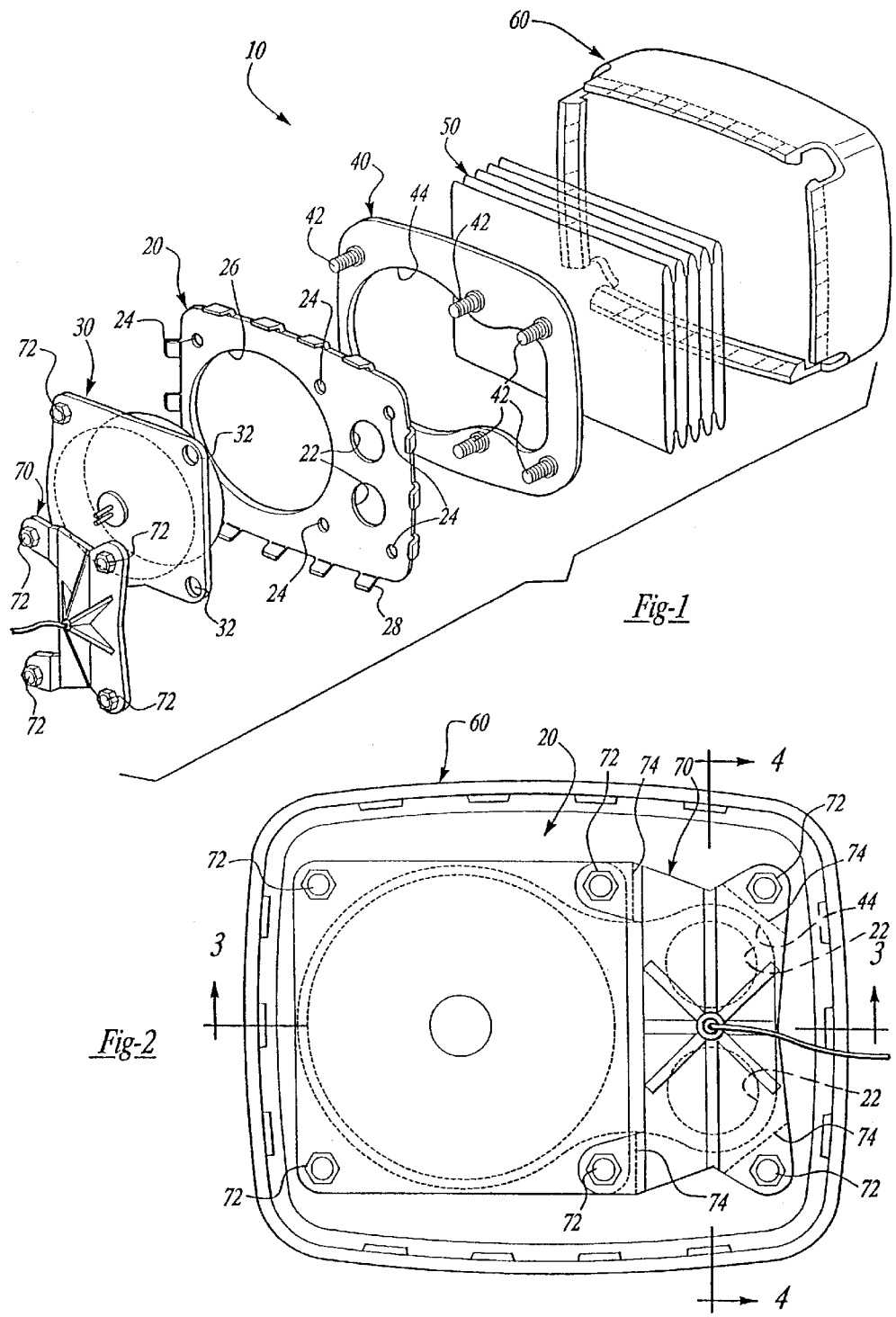

INFLATABLE RESTRAINT SYSTEM WITH SELECTABLE VENTILATION

TECHNICAL FIELD OF THE INVENTION

This invention generally relates to inflatable restraint systems for motor vehicles. More specifically, this invention relates to inflatable restraint systems that use selectable ventilation to control the energy absorbing characteristics of the inflatable restraint.

BACKGROUND

In a conventional inflatable restraint system, a sensor is used to detect the occurrence of a vehicle impact and, upon such occurrence, to deploy an inflatable cushion. Once deployed with inflation gas, the inflatable cushion provides a layer between the passenger of a vehicle and the hard surfaces of an automotive interior during vehicle impact. These systems are highly effective and have saved lives in thousands of vehicles. For some passenger and impact situations, however, the conventional inflatable restraint systems are not optimized. These situations may occur, for example, with passengers who are much smaller than the average adult, with passengers who are unbelted or "out-of-position," or in low severity impacts. In such cases, conventional inflatable restraint system may deploy an inflatable cushion with less-than-optimal energy absorption characteristics, such as excessive force.

Various techniques have been explored to control the energy absorption characteristics of the inflatable cushion. One such technique uses a dual level inflator. In these systems, a first inflator charge is used to deploy the inflatable cushion with inflation gas upon the detection of a vehicle impact, and the second inflator charge is used to further inflate the inflatable cushion only in response to specific situations. These techniques, however, suffer from the expense and complication of using such a dual level inflator.

Another such technique, as described in U.S. Pat. No. 5,074,583 (Fujita et al.), uses a discharge valve to allow ventilation of the inflatable cushion when the pressure in the inflatable cushion reaches a certain level. The ventilation of the inflatable cushion through the discharge valve limits and reduces the pressure in the inflatable cushion and may prevent the deployment of an inflatable cushion with excessive force. This technique, however, only allows control of the pressure of the inflatable cushion and does not allow any control of the energy absorption characteristic of the inflatable cushion in response to different passenger and impact situations.

Other, more recent, techniques use movable shutters, instead of discharge valves, that may be selectively activated. The ventilation of the inflatable cushion through the movable shutters also alters the energy absorption characteristics of the inflatable cushion by reducing the pressure in the inflatable cushion. Unlike the discharge valve technique, the movable shutters allows control of the energy characteristics of the inflatable cushion in response to different passenger situations. But, because of the slow response of the mechanical shutters, these techniques do not allow control of the energy absorption characteristics of the inflatable cushion in response to low severity impacts. Vehicle impacts occur too fast for a determination of a low severity impact and for an appropriate mechanical response.

Thus, the current techniques in the art fail to provide a simple, cost-effective technique to control the energy absorption characteristics of the inflatable cushion in response to passengers who are much smaller than the average adult, passengers who are unbelted or "out-of-position," and low severity impacts.

SUMMARY OF THE INVENTION

This invention provides for an inflatable restraint system that overcomes the problems and disadvantages of the conventional techniques in the art. Additionally, the present invention provides for an inflatable restraint system that controls the energy absorption characteristics of the inflatable cushion in response to passengers who are much smaller than the average adult, passengers who are unbelted or "out-of-position," and low severity impacts. Further, the present invention provides for an inflatable restraint system that can be easily modified during testing procedures and for optimal performance in different vehicles.

The invention includes an inflatable restraint system with a base plate defining a vent aperture, an inflatable cushion secured to the base plate, and a single conventional inflator for inflating the inflatable cushion with inflation gas. In some vehicle impacts, the vent aperture remains sealed with a vent plug, which inhibits ventilation of the inflation gas from the inflatable cushion through the vent aperture. In other vehicle impacts, depending on the placement and force of the impact, the speed and direction of the vehicle, and the size and placement of the passengers, the energy absorption characteristics of the inflatable cushion may be controlled. This is accomplished by an initiator, which may be selectively activated to rupture the vent plug and thereby allow selective ventilation of the inflation gas through the vent aperture. Further, by using base plates with a smaller or larger vent aperture size, the ventilation characteristics, such as the flow rate, of the inflatable restraint system can be easily modified during testing procedures and for optimal performance for different vehicle applications.

Further features and advantages of the invention will become apparent from the following discussion and accompanying drawings.

BRIEF DESCRIPTION OF THE DRAWINGS

FIG. 1 is a perspective, exploded representation of the invention;

FIG. 2 is a back view of the invention;

DETAILED DESCRIPTION OF THE PREFERRED EMBODIMENT

Figure 3:
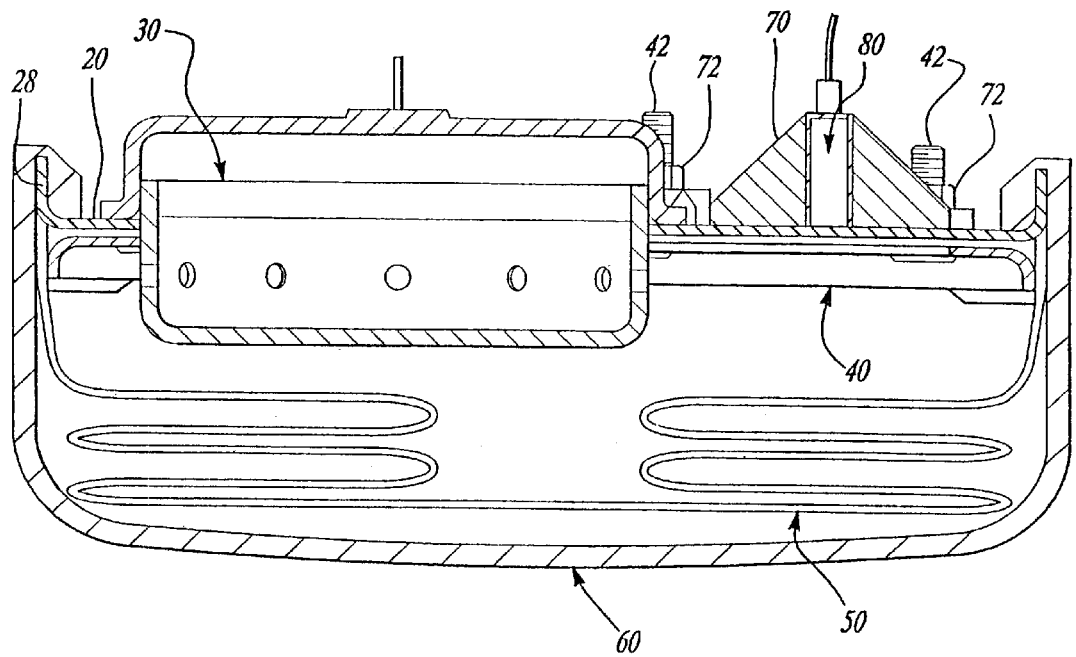
FIG. 3 is a cross-sectional view of the invention taken along the line 3—3 in FIG. 2.

The following description of the preferred embodiment is merely exemplary in nature, and is in no way intended to limit the invention or its application or uses.

The inflatable restraint system 10 of the present invention is shown in FIGS. 1 through 4. As shown in these figures, the inflatable restraint system 10 generally includes a base plate 20, an inflator 30, a cushion ring 40, an inflatable cushion 50, a trim cover 60, a vent plug 70, and an initiator 80.

The base plate 20 acts as the main anchor point for the entire inflatable restraint system 10. The base plate 20 includes vent apertures 22, mounting holes 24, a device aperture 26, and trim cover tabs 28 arranged around the perimeter of the base plate 20. In alternative embodiments, as discussed below, the vent apertures 22 may include one or more apertures, each of any shape. The particular amount, size, and shape of the apertures determine the cross-sectional area of the vent apertures 22 and, hence, affect the flow rate of inflation gas through the vent apertures 22. The base plate is made of a high-strength material, such as steel.

The inflator 30, which is mounted to the back side of the base plate 20, generates inflation gas on the front side of the base plate 20 into the inflatable cushion 50. The inflator 30 includes a base with mounting holes 32, aligning with the mounting holes 24 of the base plate 20. The inflator 30 is a conventional device that generates inflation gas for inflatable restraint systems. In the preferred embodiment, the inflator 30 is mounted to the back side of the base plate 20. In alternative embodiments, however, the inflator 30 may be mounted in a different area of the vehicle and may simply supply the inflation gas to the front side of the base plate 20 through a tube or any other medium. The inflator 30 is well known and used in the art of inflatable restraint systems and its implementation in the system of the present invention would be readily understood by one of ordinary skill in the art.

The cushion ring 40, which is mounted to the front side of the base plate 20, includes mounting bolts 42 and a device aperture 44. The mounting bolts 42 extend from the back side of the cushion ring 40 through the mounting holes 24 of the base plate 20, and through the mounting holes 32 of the inflator 30. The cushion ring 40 and the mounting bolts 42 are made of a high-strength material, such as steel. The device aperture 44, like the device aperture 26 of the base plate, is designed to allow the inflator 30 to project towards the inflatable cushion 50. The device aperture 44 of the cushion ring 40, however, is enlarged and does not block the vent apertures 22.

As shown in FIG. 3, the inflatable cushion 50 is attached to the front side of the cushion ring 40. The trim cover 60 is attached to the base plate 20 over the trim cover tabs 28 and surrounds the entire inflatable cushion 50. The inflatable cushion 50 and the trim cover 60 are both well known and used in the art of inflatable restraint systems and their implementation in the system of the present invention would be readily understood by one of ordinary skill in the art.

The vent plug 70 substantially seals the vent apertures 22 and inhibits ventilation of the inflation gas from the inflatable cushion through the vent apertures 22. The vent plug 70 includes mounting holes (not shown) to receive the mounting bolts 42 of the cushion ring 40. As shown in FIG. 2, mounting nuts 72 are tightened onto the mounting bolts 42 to secure the vent plug 70 and the inflator 30 to the back side of the base plate 20. The vent plug 70 also includes preformed tear seams 74 located near the mounting holes. The vent plug 70 is made of a low-strength material, such as nylon, that will withstand the internal pressures of a filling and filled inflatable cushion, but that will rupture upon a pyrotechnic explosion.

Figure 4:
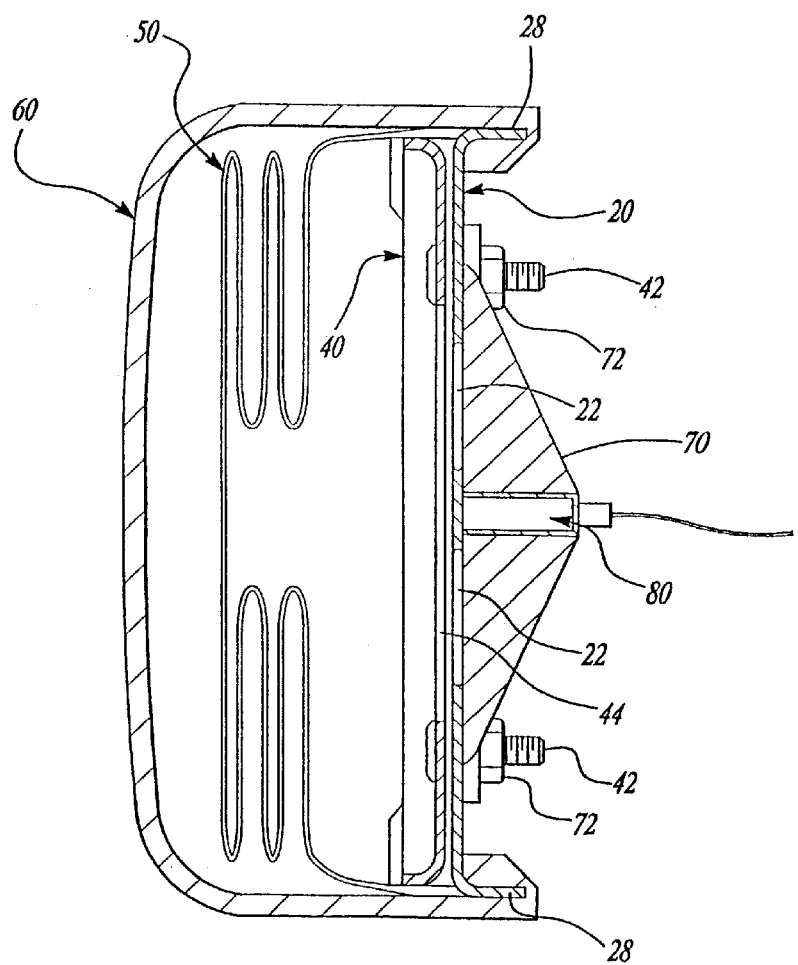
FIG. 4 is a cross-sectional view of the invention taken along the line 4—4 in FIG. 2.

As shown in FIG. 4, the initiator 80 is insert molded into the vent plug 70. In alternative embodiments, the initiator 80 is secured against the vent plug 70, or may be simply placed between the vent plug 70 and the base plate 20. The initiator includes a small filament (not shown) that generates heat upon the receipt of an electrical impulse and ignites a pyrotechnic material (not shown), which supplies the explosion and ruptures the vent plug 70. During the explosion of the pyrotechnic material, the force of the explosion pushes against the base plate 20 and the vent plug 70. Since the base plate 20 is made of a high-strength material, and the vent plug of a low-strength material, the vent plug 70 ruptures. Ideally, the rupture of the vent plug 70 occurs along the preformed tear seams 74, as shown in FIG. 2. The rupture of the vent plug 70 exposes the vent apertures 22, which form an escape route for the inflation gas and, hence, controls the energy absorbing characteristics of the inflatable restraint. Initiators with filaments and pyrotechnic material are well known and used in the art of inflatable restraint systems and their implementation in the system of the present invention would be readily understood by one of ordinary skill in the art.

The front side of the inflatable restraint system 10 is assembled by placing the cushion ring 40, already attached to the inflatable cushion 50, near the front side of the base plate 20 and inserting the mounting bolts 42 through the mounting holes 24. Then, the trim cover 60 is placed over the inflatable cushion 50 and secured to the trim cover tabs 28 of the base plate 20. The back side of the inflatable restraint system 10 is assembled by placing the inflator 30 near the back side of the base plate 20 and positioning the mounting holes 32 over the mounting bolts 42. Then, the vent plug 70 with an initiator 80 is placed near the back side of the base plate 20 and the mounting holes (not shown) are positioned over the mounting bolts 42. Finally, the mounting nuts 72 are tightened onto the mounting bolts 42 to secure the entire inflation restraint system 10.

During the operation of the present invention in a vehicle impact, a sensor (not shown) sends a signal, with two portions, to the inflation restraint system 10. The first portion of the signal activates the inflator 30 to generate inflation gas, which pushes the inflatable cushion 50 through the trim cover 60 and fills the inflatable cushion 50. The second portion of the signal selectively activates the initiator 80. Upon such selective activation, the second portion of the signal directs an electrical impulse to the initiator 80, causing the filament to heat, the pyrotechnic material to burn and explode, and the vent plug 70 to rupture along the preformed tear seams 74. The rupture of the vent plug 70 causes a "short-circuit" and the inflation gas follows this short circuit and escapes through the vent apertures 22 of the base plate 20, altering the energy absorbing characteristics of the inflatable cushion 50. The determination to ventilate the system through selective activation of the initiator 80, and the determination of the precise time to ventilate the system, is based on several factors, including the placement and force of the impact, the speed and direction of the vehicle, and the size and placement of the passengers.

In the preferred embodiment of the present invention, the vent plug 70 substantially seals the vent apertures 22 and prevents ventilation of the inflation gas from the inflatable cushion 50 through the vent apertures 22. Alternatively, the vent plug 70 may merely inhibit ventilation of the inflation gas in order to aid or replace the vents located in some conventional inflatable cushions. In either case, the vent plug 70 is designed to perform in a similar manner at zero inflation as well as at full inflation of the inflatable cushion 50. In other words, if the initiator 80 is not selectively activated during a vehicle impact, the vent plug 70 will either prevent or inhibit, depending on the specific design of the inflatable restraint system, ventilation of the inflation gas even during full inflation of the inflatable cushion 50.

During testing of the inflation restraint system 10 for different ventilation flow rates, the same design for the vent plug 70 and the initiator 80 can be used throughout. Only the size of the vent apertures 22, which can be drilled larger or smaller, needs to be altered. Further, during the installation of the inflation restraint system 10 in different vehicles, the same design for the vent plug 70 and the initiator 80 can be used and, again, only the size of the vent apertures 22 needs to be altered. Thus, the present invention provides for an inflatable restraint system that can be easily modified during testing procedures and for optimal performance in different interiors.

The foregoing discussion discloses and describes a preferred embodiment of the present invention. One skilled in the art will readily recognize from such discussion, and from the accompanying drawings and claims, that changes and modifications can be made to the invention without departing from the true spirit and fair scope of the invention as defined in the following claims.

I claim:

1. An inflatable restraint system with selectable ventilation, comprising:
   a base plate defining a vent aperture;
   an inflatable cushion secured to said base plate;
   an inflator for inflating said inflatable cushion with inflation gas;
   a vent plug secured to said base plate for substantially sealing said vent aperture and thereby inhibiting ventilation of the inflation gas from said inflatable cushion through said vent aperture;
   an initiator secured to said vent plug for rupturing said vent plug upon selective activation of said initiator and thereby allowing ventilation of the inflation gas; and
   a pyrotechnic material contained within said initiator that upon selective activation of said initiator supplies an explosion,
   whereby the force of the explosion of the pyrotechnic material pushes against the base plate and the vent plug thereby rupturing the vent plug.

2. The inflatable restraint system of claim 1, wherein said base plate further defines a second vent aperture.

3. The inflatable restraint system of claim 1, further comprising a cushion ring securing said inflatable cushion to said base plate.

4. The inflatable restraint system of claim 3, wherein said cushion ring defines a plurality of mounting bolts, and wherein said base plate further defines a plurality of mounting holes corresponding to said mounting bolts of said cushion ring.

5. The inflatable restraint system of claim 1, wherein said inflator is secured to said base plate.

6. The inflatable restraint system of claim 1, wherein said vent plug substantially seals said vent aperture and thereby inhibits ventilation of the inflation gas from said inflatable cushion through said vent aperture under full inflation of said inflatable cushion when said initiator is not selectively activated.

7. The inflatable restraint system of claim 1, wherein said vent plug substantially seals said vent aperture and thereby prevents ventilation of the inflation gas from said inflatable cushion through said vent aperture.

8. The inflatable restraint system of claim 7, wherein said vent plug substantially seals said vent aperture and thereby prevents ventilation of the inflation gas from said inflatable cushion through said vent aperture under full inflation of said inflatable cushion when said initiator is not selectively activated.

9. An inflatable restraint system with selectable ventilation, comprising:
   a base plate defining a first vent aperture and a second vent aperture;
   an inflatable cushion secured to said base plate;
   an inflator for inflating said inflatable cushion with inflation gas;
   a vent plug secured to said base plate for substantially sealing said vent apertures and thereby inhibiting ventilation of the inflation gas from said inflatable cushion through said vent apertures; and
   an initiator secured to said vent plug for rupturing said vent plug upon selective activation of said initiator and thereby allowing ventilation of the inflation gas;
   wherein said initiator creates an explosive force towards said base plate between said vent apertures upon selective activation of said initiator.

10. An inflatable restraint system with selectable ventilation, comprising
    a base plate defining a vent aperture;
    an inflatable cushion secured to said base plate;
    an inflator for inflating said inflatable cushion with inflation gas;
    a vent plug secured to said base plate for substantially sealing said vent aperture and thereby inhibiting ventilation of the inflation gas from said inflatable cushion through said vent aperture;
    an initiator secured to said vent plug for rupturing said vent plug upon selective activation of said initiator and thereby allowing ventilation of the inflation gas; and
    a cushion ring securing said inflatable cushion to said base plate;
    wherein said cushion ring defines a plurality of mounting bolts and said base plate further defines a plurality of mounting holes corresponding to said mounting bolts of said cushion ring, and, said vent plug is secured to said base plate with said mounting bolts.

11. The inflatable restraint system of claim 10, wherein said cushion ring is secured to one side of said base plate, and wherein said vent plug is secured to the other side of said base plate.

12. The inflatable restraint system of claim 10, wherein said inflator is secured to said base plate with said mounting bolts.

13. An inflatable restraint system with selectable ventilation, comprising
    a base plate defining a vent aperture;
    an inflatable cushion secured to said base plate;
    an inflator for inflating said inflatable cushion with inflation gas;
    a vent plug secured to said base plate for substantially sealing said vent aperture and thereby inhibiting ventilation of the inflation gas from said inflatable cushion through said vent aperture; and
    an initiator secured to said vent plug for rupturing said vent plug upon selective activation of said initiator and thereby allowing ventilation of the inflation gas;
    wherein said vent plug includes a plurality of tear seams for aiding the rupture of said vent plug upon selective activation of said initiator.

14. An inflatable restraint system with selectable ventilation, comprising
    a base plate defining a vent aperture and a plurality of mounting holes, and having a front side and a back side;
    a cushion ring secured to said front side of said base plate and defining a plurality of mounting bolts corresponding to said mounting holes of said base plate;
    an inflatable cushion secured to said cushion ring;
    an inflator for inflating said inflatable cushion with inflation gas;

a vent plug secured to said back side of said base plate with said mounting bolts for substantially sealing said vent aperture and thereby inhibiting ventilation of the inflation gas from said inflatable cushion through said vent aperture; and an initiator secured to said vent plug for rupturing said vent plug upon selective activation of said initiator and thereby allowing ventilation of the inflation gas.

* * * * *